Patented Dec. 19, 1933

1,939,850

UNITED STATES PATENT OFFICE 1,939,850

METHOD OF PRODUCING A FERTILIZER COMPOSITION

Audrey Hill, Milwaukee, Wis.

No Drawing. Application September 13, 1930
Serial No. 481,808

2 Claims. (Cl. 71—9)

This invention relates to an improved composition for fertilizer to be used in the treatment of trees and vegetation in general, for the purpose of improving the physical condition thereof and stimulating the productiveness of fruit bearing vegetation and bringing about a very healthy condition of all of the trees, shrubs, flowers, and other vegetation upon which the fertilizer is being used.

It is a well known fact that vegetation growing in poor soil is more readily subject to the attack of insects, various types of diseases and in general can be more quickly destroyed by such attacks, but by stimulating the growth of vegetation and increasing the strength, as well as the productiveness, it will reduce to a minimum the destruction of such vegetation through the medium of insects, diseases, and the like, and it is one of the principal objects of this invention to provide an improved type of fertilizer which will not only stimulate the growth of vegetation, increase the productiveness thereof, but will have a tendency to reduce to a minimum the attack of this vegetation by insects.

I have found by considerable experimenting that this improved composition not only stimulates the growth of vegetation, but by using the same upon flowers and plants, it not only increases the foliage of the plant, but stimulates the growth of the flower, enhancing the beauty thereof, and when applied to fruit bearing trees and shrubs, it has increased the quantity of productiveness.

The composition consists of cast iron, steel, iron ore and metallic calcium. The cast iron, steel and iron ore are separately ground, moistened, and then tempered at 110° Fahrenheit. The tempering of these ingredients varies considerable, and the tempering of the iron ore requiring approximately 336 hours, while the cast iron and steel will require tempering from 500 to 675 hours.

During the time that these ingredients are tempered, the mixture should be kept in a moistened condition.

After the above tempering process, the resultant fine granules are then removed and are combined with the metallic calcium. This mixture will provide a powdered composition which can be placed around the roots of a tree and mixed with the soil in order to stimulate the growth of the vegetation.

I have found that the following ingredients produce the best results: cast iron 50%; steel 25%; iron ore 20% and metallic calcium 5%.

If desired the powder can be mixed with distilled water, say about one part powder to four parts water. Where the fertilizer is to be applied to small plants and flowers, it will be found that, when the powder is mixed with water, the same is the most convenient to handle, while with the use of large quantities, the powder is used and the best results can be obtained by applying this fertilizer to the vegetation in the fall of the year, as it takes quite some time for the material to work into the roots of the shrubbery and trees.

It is believed from the foregoing that I have provided a comparatively simple type of fertilizer which will be of great benefit in the propagation of vegetation, so as to stimulate the growth thereof and increase the productiveness of flowering plants, as well as fruit bearing shrubbery and trees. The fertilizer can be manufactured at a very low cost and through experience has been found to stimulate the growth and productiveness of vegetation.

I claim:

1. The method of producing a fertilizer consisting in first separately grinding cast iron, steel, and iron ore; second, mixing the ground ingredients together; third, maintaining the mixture at a temperature of substantially 110 degrees Fahrenheit and moistening the same with water for a period of time from two to four weeks; and finally combining the resultant mass with metallic calcium.

2. The method of producing a fertilizer consisting in first separately grinding cast iron, steel and iron ore; second, mixing the ground ingredients together; third, maintaining the mixture at a temperature of substantially 110 degrees Fahrenheit and keeping the same moist for a period of time of from two to four weeks; and finally mixing the mass with metallic calcium, the ingredients being used substantially in the following proportions: Cast iron 50%, steel 25%, iron ore 20% and metallic calcium 5%.

AUDREY HILL.